United States Patent [19]
Lynch et al.

[11] Patent Number: 5,926,263
[45] Date of Patent: Jul. 20, 1999

[54] SIDE-TONE OTDR FOR IN-SERVICE OPTICAL CABLE MONITORING

[75] Inventors: Robert L. Lynch, Colts Neck; Richard L. Maybach, Holmdel, both of N.J.

[73] Assignee: Tyco Submarine Systems Ltd., Morristown, N.J.

[21] Appl. No.: 08/728,592

[22] Filed: Oct. 10, 1996

[51] Int. Cl.⁶ .................................................. G01N 21/88
[52] U.S. Cl. .......................................................... 356/73.1
[58] Field of Search ............................................ 356/73.1

[56] References Cited

U.S. PATENT DOCUMENTS

| | | | |
|---|---|---|---|
| 3,981,592 | 9/1976 | Williams | 356/237 |
| 4,212,537 | 7/1980 | Golob et al. | 356/237 |
| 5,436,746 | 7/1995 | Hirst | 359/110 |

*Primary Examiner*—Vincent P. McGraw
*Attorney, Agent, or Firm*—Mark K. Young

[57] ABSTRACT

An OTDR provides both in-service and out-of-service measurement information for an optical transmission system with multiple repeaters. The repeaters include an optical high-loss loop back (HLLB) path and an OTDR path. The OTDR is coupled to the input lines of the optical transmission system via an optical coupler so that both traffic signals and test signals from the OTDR can be transmitted simultaneously. When the OTDR is providing in-service measurement information, test signals in the form of side-tone pulses are transmitted on the transmission system. The wavelengths of the test signals are sufficiently offset from the wavelength of the traffic signal so there is minimal interference between them. The level of the test signals is low relative to the traffic signal to also minimize interference. The OTDR filters out the traffic signal from the returned signal. The HLLB path through the amplifier pairs of each repeater is distinguishable in the filtered returned signal. When the OTDR is providing out-of-service measurement information, the level of the side-tone pulses is increased because interference with traffic signal is no longer a concern. Both the HLLB path and the OTDR path are distinguishable in the filtered returned signal when the higher level out-of-service test pulses are transmitted.

12 Claims, 2 Drawing Sheets

SIDE-TONE OTDR FOR IN-SERVICE OPTICAL CABLE MONITORING

BACKGROUND OF THE INVENTION

The present invention is directed to an Optical Time-Domain Reflectometer ("OTDR"). More particularly, the present invention is directed to an OTDR that provides inservice measurement capabilities for an optical cable.

An OTDR is a fiber-optic measurement instrument. An OTDR operates by sending a short light pulse down a fiber and monitoring the small fraction of the light scattered or reflected back to it. The reflected light can be used to determine if there is a fault in the fiber.

FIG. 1 is a block diagram of a typical optical transmission system. The transmission system includes an outgoing optical fiber 10 and an incoming optical fiber 12. The fibers 10 and 12 require amplifiers 15–20 because the optical signal attenuates over long distances. However, the typical amplifier includes an optical isolator (not shown) that prevents optical signals from traveling backwards.

An OTDR cannot practically be used with the optical transmission system shown in FIG. 1 because reflected light is blocked by the optical isolators in the amplifiers 15–20. If an OTDR sends a light pulse on the outgoing optical fiber 10 at point 2, no light reflected in the fiber 10 past the amplifier 15 can be returned to the OTDR. Therefore, only a limited section of the fiber 10 up to amplifier 15 can be measured by the OTDR.

A repeater is a unit that includes both an outgoing amplifier and an incoming amplifier. In FIG. 1, a repeater 21 includes amplifiers 15 and 20. Some repeaters include a path between the amplifiers. Prior art measuring devices utilize this path to send light pulses on an input fiber 10 and receive the reflections on the output fiber 12. However, these prior art devices can only be used when the optical transmission system is out-of-service because the light pulses interfere with the traffic signal.

Based on the foregoing, there is a need for an OTDR that can provide some measuring capabilities for an optical transmission system without requiring the transmission system to be out-of-service.

SUMMARY OF THE INVENTION

The present invention is an OTDR that provides both in-service and out-of-service measurement information for an optical transmission system with multiple repeaters. The repeaters include an optical high-loss loop back (HLLB) path and an OTDR path. The OTDR is coupled to the input lines of the optical transmission system via an optical coupler so that both traffic signals and test signals from the OTDR can be transmitted simultaneously. When the OTDR is providing in-service measurement information, test signals in the form of side-tone pulses are transmitted on the transmission system. The wavelengths of the test signals are sufficiently offset from the wavelength of the traffic signal so there is minimal interference between them. The level of the test signals is low relative to the traffic signal to also minimize interference. The OTDR filters out the traffic signal from the returned signal. The HLLB path through the amplifier pairs of each repeater is distinguishable in the filtered returned signal.

When the OTDR is providing out-of-service measurement information, the level of the side-tone pulses is increased because interference with the traffic signal is no longer a concern. Both the HLLB path and the OTDR path are distinguishable in the filtered returned signal when the higher level out-of-service test pulses are transmitted.

DETAILED DESCRIPTION

The invention will be described in connection with an optical transmission system that includes multiple repeaters. The invention is an OTDR that can be used with such a transmission system without requiring the system to be out-of-service.

Figure 1:
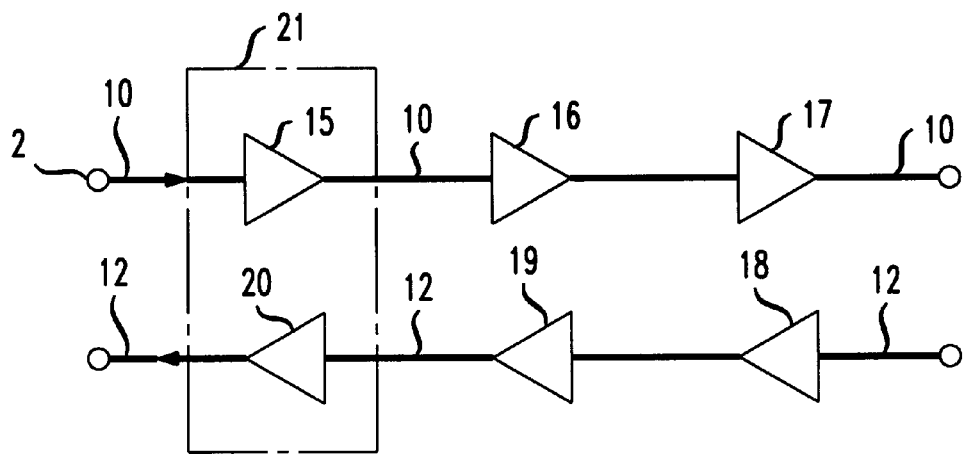
FIG. 1 is a block diagram of a typical optical transmission system.
Figure 2:
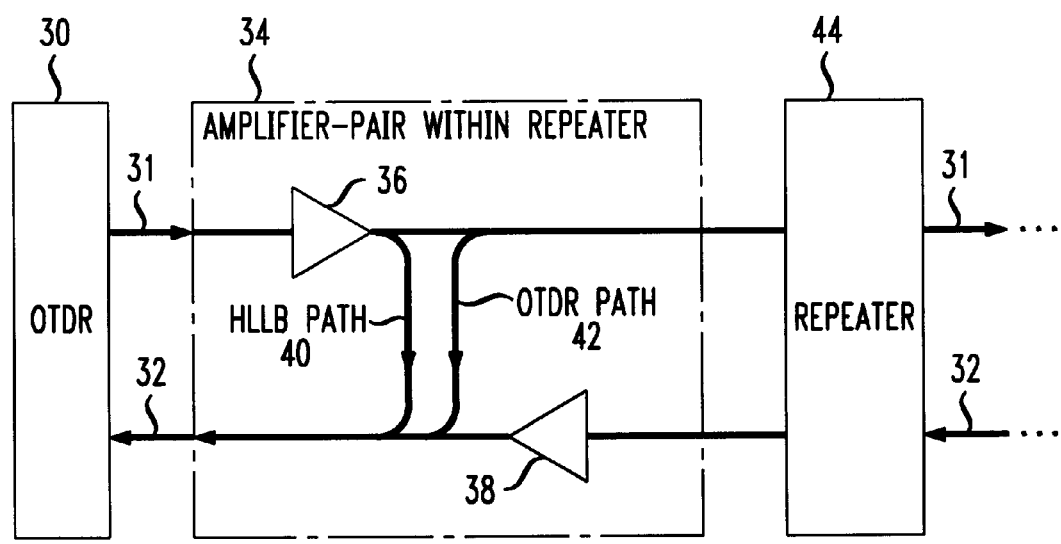
FIG. 2 is a block diagram of the present invention coupled to an exemplary optical transmission system.

Referring now in detail to the drawings, wherein like parts are designated by like reference numerals throughout, there is illustrated in FIG. 2 a block diagram of the present invention, and of an exemplary optical transmission system in which the present invention may be deployed. In FIG. 2, the OTDR 30 of the present invention is coupled to an outgoing optical fiber line 31 via an optical coupler (not shown), allowing both the traffic and OTDR 30 test signals to be applied simultaneously. Similarly, the signal returned to the OTDR 30 receiver is obtained from an incoming optical fiber line 32 via an optical coupler (not shown) without interruption of the traffic path.

In the optical transmission system, repeaters 34, 44 are coupled to the outgoing and incoming lines 31, 32. The internal structure of the repeater 34 shown in FIG. 2 is identical to the internal structure of all the repeaters in the transmission system. The repeater 34 includes an outgoing amplifier 36 and an incoming amplifier 38. The outgoing amplifier 36 is coupled to the input line 31, and the incoming amplifier 38 is coupled to the output line 32. Two paths couple the input line 31 to the output line 32: the optical high-loss loop back (HLLB) path 40 and the OTDR path 42. The HLLB path 40 allows measurement of the loop gain between an amplifier pair in each repeater 34, 44. The OTDR path 42 couples reflected (scattered) light from the downstream fiber in the transmit direction back into the receiving fiber (for each amplifier pair).

The OTDR 30 can operate in two different modes: an in-service mode and an out-of-service mode. The OTDR 30 utilizes side-tone test pulses having a wavelength that differs from the wavelength of the traffic signal. In in-service mode, the level of the test pulses are significantly smaller than the level of the traffic signals. In the out-of-service mode, the levels of the test pulses are increased.

Figure 3:
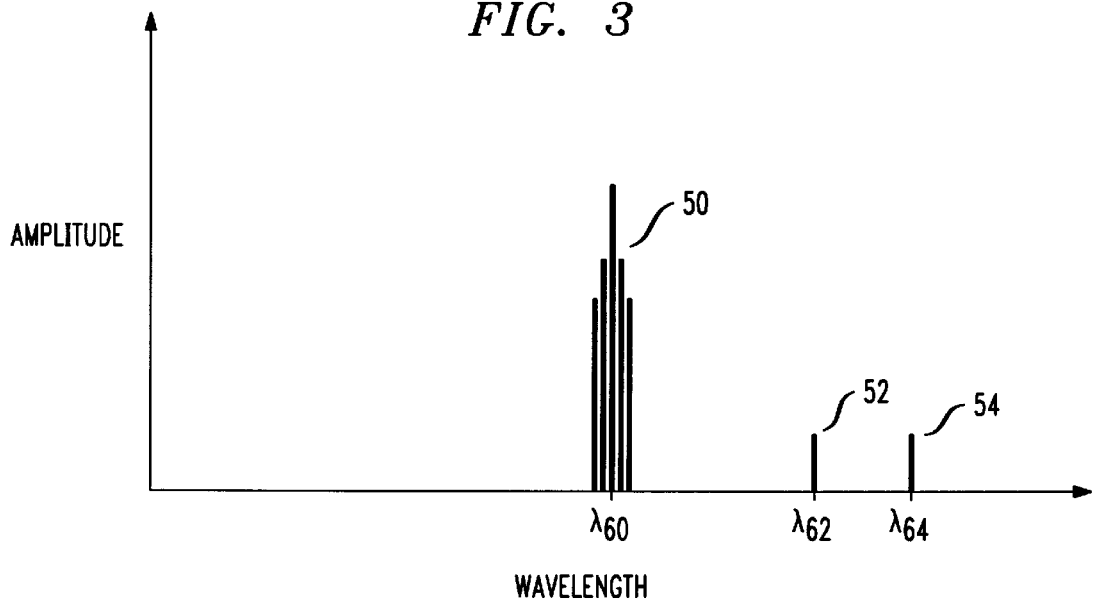
FIG. 3 is a graph of the test pulses transmitted by the present invention.

FIG. 3 is a graph showing the test pulses transmitted by the OTDR 30 in one embodiment of the present invention while the OTDR 30 is being used in in-service mode. An in-service traffic signal 50 is transmitted at a wavelength 60, while two side-tone test pulses 52 and 54 are transmitted at wavelengths 62 and 64, respectively. The wavelengths 62 and 64 are sufficiently offset from the wavelength 60 of the traffic signal 50 so that there is minimal interference between them. When the OTDR 30 is used in out-of-service mode, the level of the test signals 52, 54 is increased.

In the embodiment shown in FIG. 3, two test signals 52, 54 are used so that the power applied to all of the amplifiers in the transmission system can be maintained constant. Optionally, a single side-tone pulse can be used as the test signal. In this embodiment, the traffic signal is utilized to provide constant power to the amplifiers.

In either embodiment, the test signals can comprise a pseudo-random bit stream instead of pulses.

Figure 4:
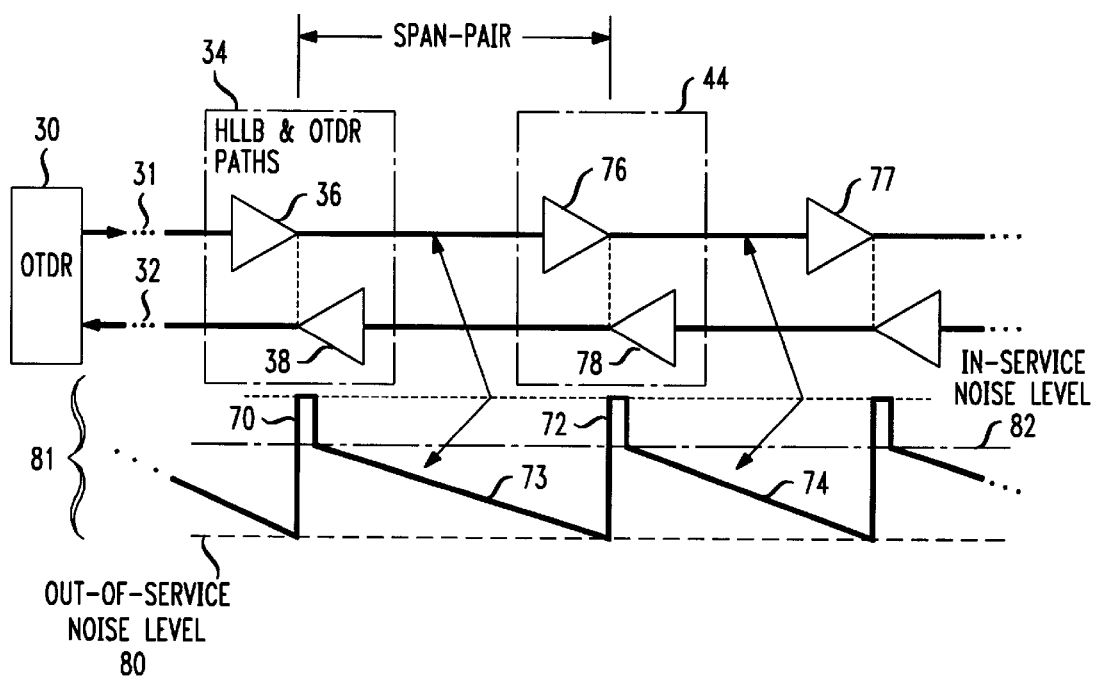
FIG. 4 is a graph of the returned signal from the optical transmission system, and a block diagram of the corresponding optical transmission system.

FIG. 4 is a graph of a returned signal 81 received on output line 32 by the OTDR 30 in response to the test signals 52, 54 shown in FIG. 3, or in response to the test signals in other embodiments of the OTDR 30. The graph is shown adjacent to the transmission system previously described. The receiver in the OTDR 30 has a narrow bandpass characteristic so as to reject the traffic signal on the output line 32 and pass only the returned signal 81.

In FIG. 4, the returned signal 81 comprises multiple bumps 70, 72, and multiple sloping sections 73, 74. The bumps 70, 72 represents the loop gain of HLLB paths between the amplifier pairs in each repeater. For example, bump 70 represents the loop gain of the HLLB path between amplifiers 36 and 38 of repeater 34. Bump 72 represents the loop gain of the HLLB path between amplifiers 76 and 78 of repeater 44.

The sloping sections 73 and 74 utilize the OTDR paths and represent the OTDR characteristic of the outgoing fiber between each set of adjacent amplifier pairs in the transmission system. For example, sloping section 73 represents the OTDR characteristic of the outgoing fiber between amplifier 36 and 76. Sloping section 74 represents the OTDR characteristic of the outgoing fiber between amplifiers 76 and 77.

The returned signal 81 has a varying noise level depending on whether the OTDR 30 is operated in-service or out-of-service. The noise level relative to the returned signal 81 is increased when the OTDR 30 is operated in-service because the levels of the test signals 52, 54 (FIG. 3) are low. Line 82 represents the noise level during in-service operation of the OTDR 30. At this noise level, the sloping sections 73 and 74 are not distinguishable by the OTDR 30. Therefore, when the OTDR 30 is used in-service, only bumps 70, 72 are usable as measurement information.

In contrast, when the OTDR 30 is used out-of-service, there is no traffic signal 60, and the levels of the test signals 52 and 54 are increased. This causes the out-of-service noise level to be reduced, as indicated by line 80 in FIG. 4. At this level, the entire returned signal 81 is distinguishable. Therefore, when the OTDR 30 is used out-of-service, both the bumps 70, 72 and the sloping sections 73, 74 are usable as measurement information.

The two different modes of operation by the OTDR 30 provide different measurement information for the transmission system. In in-service mode, the OTDR signal power applied to the system is at a "low" state, such that there is minimal effect on the traffic signal. The noise relative to the received signal allows only the HLLB paths through the amplifier pairs (bumps 70, 72 in FIG. 4) to be distinguishable. Comparing measurement runs by the OTDR 30 made at different times allows one to detect changes in system gain, identifiable among a "span-pair", but not within a span pair. A span-pair is an adjacent pair of repeaters, such as the span-pair shown in FIG. 4 between repeaters 34 and 44.

In out-of-service mode, the OTDR 30 signal power applied to the system is at a "high" state, such that the received OTDR signal increases sufficiently to distinguish returns via both the OTDR paths (sloping lines 73, 74 in FIG. 4) and the HLLB paths. This allows the location of a fiber fault to be located within a span-pair to an accuracy dependent of the width of the transmitted test pulses, or the bit rate of the test pseudo-random pattern.

The OTDR 30 can also be used with optical transmission systems employing Wavelength Division Multiplexing (WDM) where several wavelengths are sent simultaneously over a single fiber. In a WDM system, some wavelengths can be dropped and added at a branching point. HLLB and OTDR paths can be provided at the branching point to allow side-tone OTDR measurement to be made on the drop/add transmission paths as well as the through transmission path. The wavelength offset of the test signals in a WDM system must be small enough to pass through the narrow bandpass filter in the OTDR 30 receiver along with the dropped or added traffic wavelength, yet be far enough away to avoid interference with it. In an WDM system, out-of-service can apply to one or more traffic wavelength assignments while other wavelengths on a fiber pair are still carrying traffic.

The OTDR 30 of the present invention provides measurement information for a optical transmission system when the system is both out-of-service and in-service. What has been described is merely illustrative of the application of the principles of the present invention. Other arrangements and methods can be implemented by those skilled in the art without departing from the spirit and scope of the present invention.

What is claimed is:

1. A method of using an optical time-domain reflectometer in-service with an optical transmission system that includes at least one repeater, wherein said transmission system transmits a traffic signal, comprising the steps of:

transmitting a first test pulse and a second test pulse on the optical transmission system, wherein said first and second test pulses are at a different wavelength than said traffic signal and are each at a different wavelength;

receiving a returned signal; and using said return signal to determine measurement information for the optical transmission system.

2. The method of claim 1, wherein said first and second test pulses are transmitted at a lower level than said traffic signal.

3. The method of claim 1, wherein said first and second test pulses are transmitted through an optical high-loss loop back path in said transmission system.

4. The method of claim 2, further comprising the step of filtering said return signal to eliminate said traffic signal.

5. The method of claim 4, wherein said measurement information indicates faults in the optical transmission system.

6. The method of claim 1, wherein said at least one repeater includes an amplifier, said method further comprising the step of:

maintaining a constant power to the amplifier.

7. An optical time-domain reflectometer for an optical transmission system that includes at least one repeater and transmits a traffic signal, said optical time-domain reflectometer comprising:

means for transmitting a first test pulse and a second test pulse on the optical transmission system, wherein said first and second test pulses are at a different wavelength than the traffic signal and are each at a different wavelength;

means for receiving a returned signal; and means for using said return signal to determine measurement information for the optical transmission system.

8. The optical time-domain reflectometer of claim 7, wherein said first and second test pulses are transmitted at a lower level than the traffic signal.

9. The optical time-domain reflectometer of claim 7, wherein said first and second test pulses are transmitted through an optical high-loss loop back path in said transmission system.

10. The optical time-domain reflectometer of claim 7, further comprising:

means for filtering said return signal to eliminate said traffic signal.

11. The optical time-domain reflectometer of claim 7, wherein said measurement information indicates faults in the optical transmission system.

12. The optical time-domain reflectometer of claim 7, wherein said at least one repeater includes an amplifier, said reflectometer further comprising:

means for maintaining a constant power to the amplifier.

* * * * *